US009092294B2

(12) United States Patent
Kumar et al.

(10) Patent No.: US 9,092,294 B2
(45) Date of Patent: Jul. 28, 2015

(54) SYSTEMS, APPARATUS, AND METHODS FOR UTILIZING A REACHABILITY SET TO MANAGE A NETWORK UPGRADE

(75) Inventors: Sanjaya Kumar, South Elgin, IL (US); Steve Hoffman, Chicago, IL (US); Dusty Hendrickson, Chicago, IL (US); Bart Cilfone, Chicago, IL (US)

(73) Assignee: Cleversafe, Inc., Chicago, IL (US)

( * ) Notice: Subject to any disclaimer, the term of this patent is extended or adjusted under 35 U.S.C. 154(b) by 0 days.

(21) Appl. No.: 12/426,623

(22) Filed: Apr. 20, 2009

(65) Prior Publication Data

US 2010/0268806 A1 Oct. 21, 2010

(51) Int. Cl.
*G06F 9/445* (2006.01)

(52) U.S. Cl.
CPC .......................... *G06F 8/65* (2013.01)

(58) Field of Classification Search
USPC .......................... 709/223, 201; 717/168–178
See application file for complete search history.

(56) References Cited

U.S. PATENT DOCUMENTS

| | | | |
|---|---|---|---|
| 4,092,732 A | 5/1978 | Ouchi | |
| 5,454,101 A | 9/1995 | Mackay et al. | |
| 5,485,474 A * | 1/1996 | Rabin ........................ | 714/762 |
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |

(Continued)

OTHER PUBLICATIONS

Chris Sanders, "Deploying Windows Server Update Services", May 6, 2008.*

(Continued)

*Primary Examiner* — Ryan Jakovac
(74) *Attorney, Agent, or Firm* — Garlick & Markison; Timothy W. Markison

(57) ABSTRACT

A method of upgrading software components within a dispersed data storage network is disclosed. A list of identifiers corresponding to devices within the dispersed data storage network is assembled. Each member of the list is assigned to an upgrade set based on the devices that are reachable by the vaults associated with the device.

10 Claims, 14 Drawing Sheets

(56) References Cited

U.S. PATENT DOCUMENTS

| | | | |
|---|---|---|---|
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2009/0241100 | A1* | 9/2009 | Sakurai et al. ............... 717/170 |
| 2009/0265701 | A1* | 10/2009 | Naslavsky et al. ............ 717/172 |
| 2010/0023524 | A1 | 1/2010 | Gladwin et al. |
| 2010/0218179 | A1* | 8/2010 | Balascio et al. .............. 717/171 |
| 2012/0110317 | A1* | 5/2012 | Scheer et al. ................ 713/150 |

OTHER PUBLICATIONS

Shamir; How to Share a Secret; Communications of the ACM; vol. 22, No. 11; Nov. 1979; pp. 612-613.

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

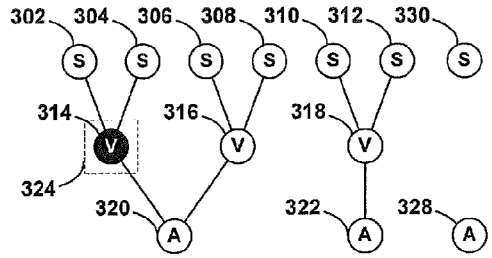

Step 1: Create a new upgrade set (324) and add a vault (314) that has not been selected yet.

Figure 3b

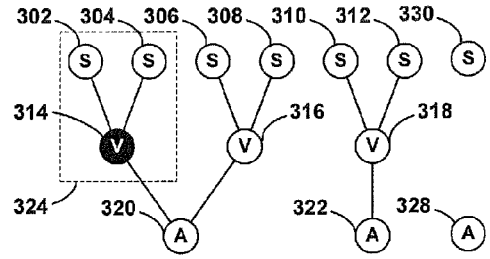

Step 2: Discover all Slice Servers associated with the vault (314) and add them to upgrade set (324)

Figure 3c

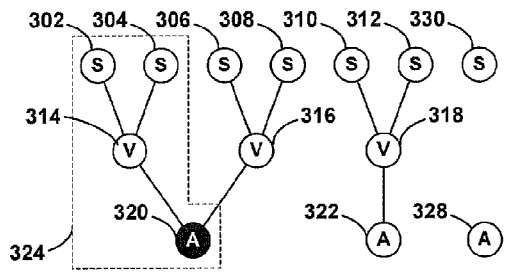

Step 3: Discover all vaults associated with slice servers (302, 304) No vaults found so skip ahead to Step 4.
Step 4: Discover all Grid Access Computers associated with vault (314) and add them to upgrade set (324)

Figure 3d

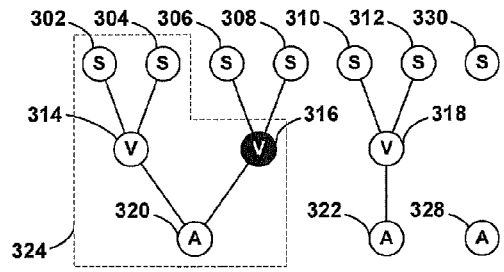

Step 5: Discover all Vaults associated with Grid Access Computer (320) and add them to upgrade set (324)

Figure 3e

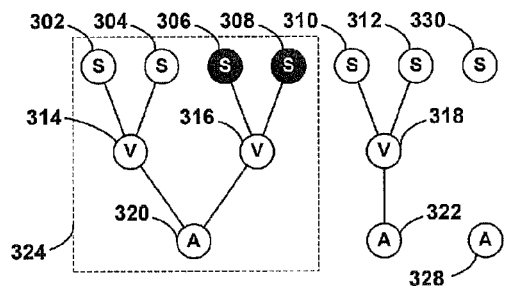

Step 6: Discover all Slice Servers associated with vault (316)

Figure 3f

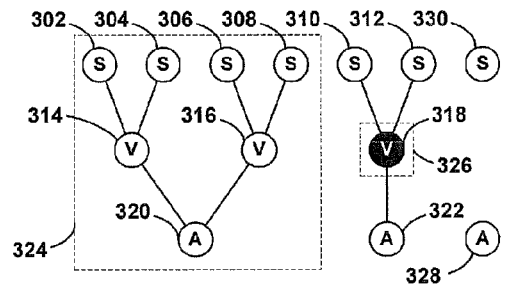

Step 7: Since there are no more associations in this upgrade set, jump back to step 1.
Step 1: Create a new upgrade set (326) and add a vault (318) that has not been selected yet.

| Legend | |
|---|---|
| (S) Slice Server | (A) Grid Access Computer |
| (V) Vault | Upgrade Set |

400

700

800

1000

1100

1200

1300

SYSTEMS, APPARATUS, AND METHODS FOR UTILIZING A REACHABILITY SET TO MANAGE A NETWORK UPGRADE

CROSS-REFERENCE TO RELATED APPLICATIONS

None

FIELD OF THE INVENTION

The present invention relates generally to systems, apparatus, and methods for managing a network upgrade, and more particularly to systems, apparatus, and methods for managing the upgrade of a dispersed data storage network using a reachability set tailored to the specific network.

DESCRIPTION OF THE PRIOR ART

Dispersed data storage systems provide storage by utilizing an information dispersal algorithm to slice data into a plurality of data slices, each of which is stored using a separate storage node. When data needs to be read from the dispersed data storage system, the data slices are read from the storage nodes, and the original data is reassembled. Schemes for implementing dispersed data storage systems, such as dispersed data storage networks ("DDSNs"), are known in the art. For example, U.S. Pat. No. 5,485,474 Rabin, describes a system for splitting a segment of digital information into n data slices, each of which is stored in a separate device. When the stored data segment must be retrieved, only m of the original data slices must be read to reconstruct the data segment, where n>m.

A dispersed data storage network is composed of multiple hardware and software components, such as storage devices, client computers, access software, etc. While software for use in personal computing is generally instantiated as needed by a user, a software component that is used to implement a part of a dispersed data storage network is usually automatically started when the device on which it operates is started. Furthermore, these software components usually run continuously until stopped. Such programs that start automatically and run continuously are known as "daemons" and "services."

It is often desirable to make modifications to services to solve problems or "bugs" that have been discovered after a software component has been installed, or to add new features from a newer version of the software component. When a software upgrade is performed, the latest version of the software component to be upgraded is downloaded or provided on a physical medium, such as a compact disk. The service to be upgraded is deactivated by an administrator, who then installs new software, overwriting the previously used software component in the process.

While the upgrade process described above is well-known and can be performed reliably for small networks, it puts a great deal of burden on the administrator, who must manually install each upgraded software component. In addition, dispersed data storage networks are often implemented using hundreds of computers over a geographic area spanning hundreds or even thousands of square miles. Accordingly, a manual upgrade would have to be coordinated among a multitude of people, and great care would have to be used to accomplish the upgrade expeditiously.

If a component of a dispersed data storage network is deactivated during a software upgrade, in many cases, the entire dispersed data storage network becomes unusable until the upgrade completes. Furthermore, the components of a dispersed data storage network are often related in a complex and changing manner, and therefore, it is also difficult for an administrator to plan what components to upgrade simultaneously. As different versions of software components may not be operable with one another, a partially upgraded dispersed data storage network may be entirely inoperable.

OBJECTS OF THE INVENTION

Accordingly, it is an object of this invention to provide a system, apparatus, and method for upgrading software components operating on a dispersed data storage network.

Another object of the invention is to provide a system, apparatus, and method for simultaneously upgrading all related software components within a dispersed data storage network, thereby minimizing downtime.

Another object of the invention is to provide a system, apparatus, and method for upgrading a part of a dispersed data storage network, thereby allowing other portions of the dispersed data storage network to continue operating.

Another object of the invention is to provide a system, apparatus, and method for automatically upgrading all related software components within a dispersed data storage network.

Other advantages of the disclosed invention will be clear to a person of ordinary skill in the art. It should be understood, however, that a system, method, or apparatus could practice the disclosed invention while not achieving all of the enumerated advantages, and that the protected invention is defined by the claims.

SUMMARY OF THE INVENTION

The disclosed invention achieves its objectives by providing a method for upgrading software components operating on a network. The devices comprising the network are related by a tying software structure. A list of information records is created, whereby each information record corresponds to a device on the network. The devices in the list are iterated over, with the device at the head of the list being selected, and a new upgrade set being created. A recursive procedure accepting an upgrade set and an information record is defined, comprising the following steps. The information record is added to the upgrade set, and a list of tying structures associated with the device referenced by the information record is retrieved. The list of tying structures is iterated over, with the tying structure at the head of the list being selected and removed from the list of tying structures. A second list of information records corresponding to devices associated with the selected tying structure is retrieved, and the second list of information records is iterated over. The information record at the head of the second list of information records is selected and removed from the list, and the recursive procedure is called again with the present upgrade set and the selected information record.

In a separate embodiment of the disclosed upgrade process, a network comprises devices of a first type and devices of a second type. One or more tying structures relate one or more devices of a first type to one or more devices of a second type. An upgrade set is constructed by selecting a tying structure and adding identifiers corresponding to all devices of a first type and all devices of a second type related by said tying structure to said upgrade set.

In a further embodiment of the disclosed upgrade process, the devices of a first type are slice servers, the devices of a second type are grid access computers, and the tying structures are vaults.

In an addition embodiment of the disclosed upgrade system, a system for upgrading software components operating on a network comprises one or more devices of a first type, one or more devices of a second type, and an upgrade manager. The upgrade manager access a plurality of tying structures that relate one or more devices of a first type to one or more devices of a second type. The upgrade manager assembles an upgrade set by selecting a tying structure, and delivers appropriate software upgrades to all members of the upgrade set.

In a further embodiment of the disclosed upgrade system, the devices of a first type are slice servers, the devices of a second type are grid access computers, and the tying structures are vaults.

In another embodiment of the disclosed upgrade manager, an upgrade manager is comprised of a network port adapted to communicate over a network, a storage device for storing software upgrades, and a processor. The processor builds an upgrade set by selecting a tying structure that relates devices of a first type to devices of a second type; all devices referenced by the tying structure are added to the upgrade set. The processor then provides appropriate software upgrades to all devices included in the upgrade set.

In a further embodiment of the disclosed upgrade manager, the devices of a first type are slice servers, the devices of a second type are grid access computers, and the tying structures are vaults.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIGS. 3a-3f is an illustration of the process of assembling a collection of upgrade sets corresponding to the components of a dispersed data storage network;

DETAILED DESCRIPTION OF THE ILLUSTRATED EMBODIMENT

Figure 1:
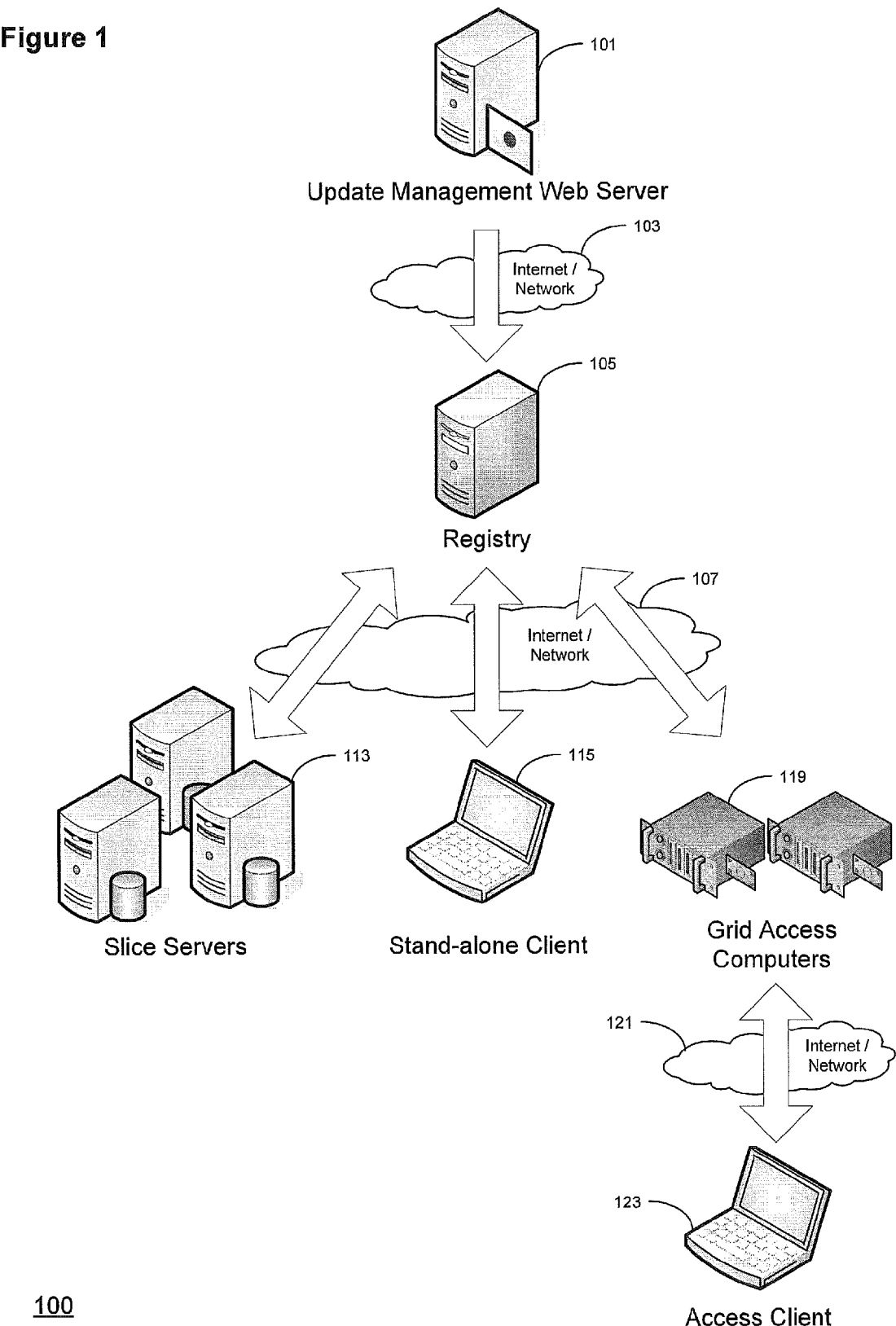
FIG. 1 is a block diagram of an upgrade system used with a dispersed data storage network.

Referring to the figures and to FIG. 1 in particular, a representative block diagram of a dispersed data storage network utilizing the disclosed update management system is depicted. An update manager 101 interfaces with a registry computer 105. The registry computer 105 provides information about related devices as well as vault information to a plurality of slice servers 113 as well as one or more grid access computers 119 and any stand-alone clients 115. Networks 103, 107, and 121 allow different components of the dispersed data storage network to communicate. These networks can be of any suitable, high-speed type, such as, for example, the Internet, a LAN, or a WAN.

The registry computer 105, the operation of which is more fully described in U.S. patent application Ser. No. 61/141,494, titled Systems, Methods & Apparatus for Identifying Accessible Dispersed Digital Storage Vaults Utilizing a Centralized Registry, provides information about the dispersed data storage network's topography to other components, such as slice servers 113, stand-alone clients 115, and grid access computers 119.

Access Client 123 issues requests to read and write data segments from the dispersed data storage network to grid access computers 119.

Grid access computers 119 accept requests to read and write data segments from access clients 123. When a read request is received, grid access computers 119 issue data slice read requests to appropriate slice servers 113, read a sufficient number of constituent data slices, and reassemble the requested data segment using a reverse information dispersal algorithm. The data segment is then returned to the requesting access client 123. When a request to write a data segment is received, grid access computers 119 apply an information dispersal algorithm to the data segment to generate n data slices, where n varies based on the dispersed data storage network. The data slices are then written to appropriate slice servers 113.

Grid access computers 119 also maintain account information for individual users (as opposed to client computer) using a construct referred to herein as a vault. A vault is a form of tying software structure that associates client accounts with slice servers 113 and various grid access devices, such as grid access computers 119 and stand-alone clients 115. Vaults and their operation are more fully defined in U.S. applicant Ser.

No. 11/973,621 and titled Virtualized Data Storage Vaults on a Dispersed Data Storage Network.

Stand-alone clients 115 are client computers capable of directly accessing slice servers 113, and, accordingly, combine the functions of access clients 123 and grid access computers 119.

It should be noted that persons of skill in the art will realize that the disclosed network topography is not a limitation of the disclosed invention, which could be used with a variety of networks, including other dispersed data storage network topographies, or networks other than dispersed data storage networks.

The disclosed upgrade system utilizes the concept of reachability to define an upgrade set consisting of all devices having certain defined relationships. In particular, reachability sets are determined based on the relationships between different devices comprising a dispersed data storage network. If a particular dispersed data storage network is envisioned as a graph, links will exist between those devices that are related to one another. A reachability set is defined as the set of all devices that are connected by one or more links based on relationships between the devices. As explained more fully herein, vaults serve as tying software constructs and establish relationships between grid access devices and slice servers.

Figure 2:
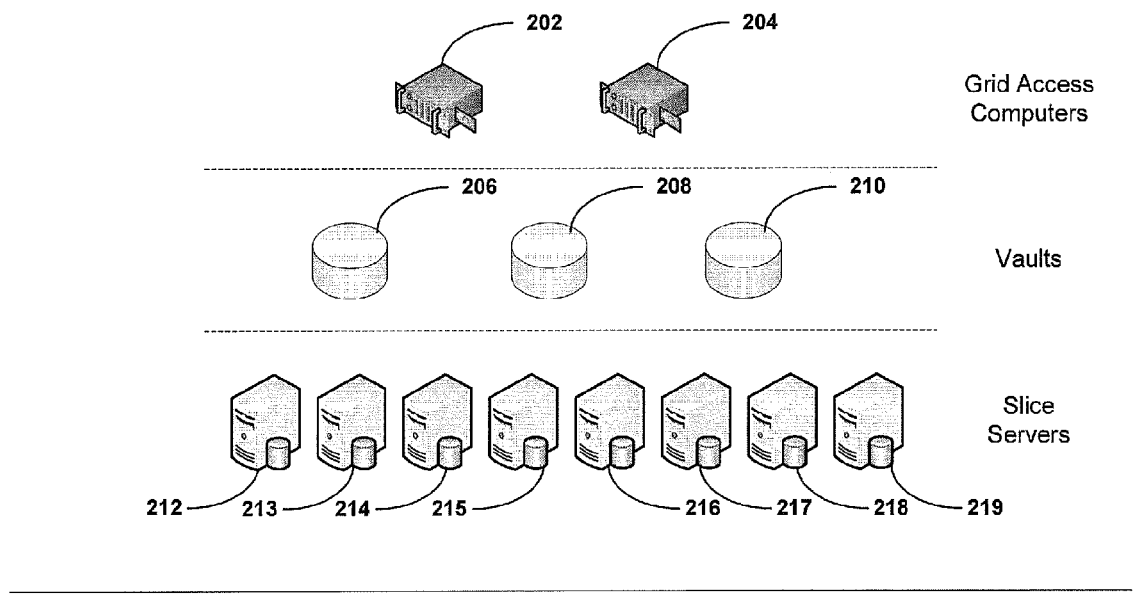
FIG. 2 is a simplified system diagram illustrating the primary components of a dispersed data storage network.

FIG. 2 illustrates the basic components of a dispersed data storage network. As depicted, two grid access computers 202 and 204 host three vaults 206, 208, and 210. A total of eight slice servers 212-219 store data slices for the dispersed data storage network.

Figure 2A:
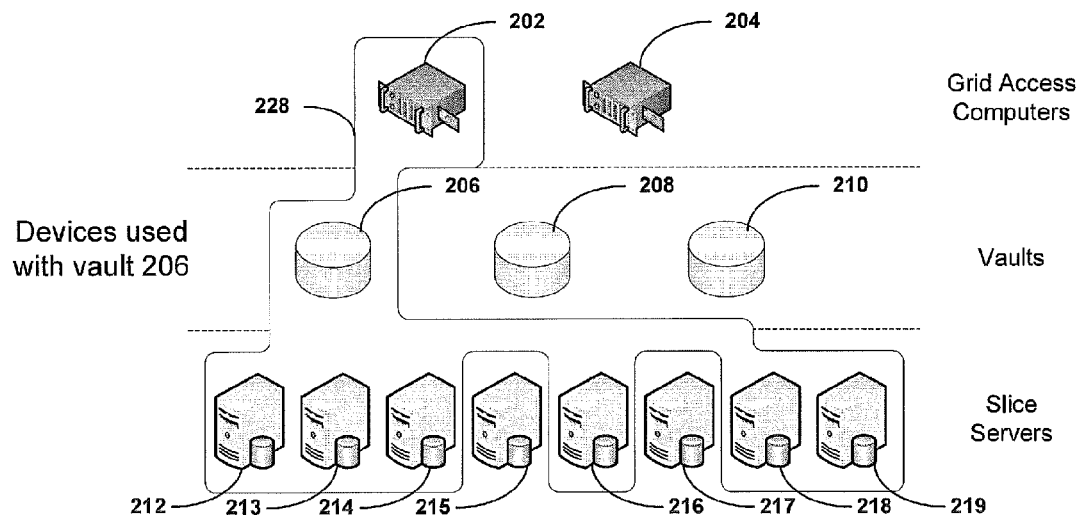
FIG. 2a is a simplified system diagram illustrating the grid access computers and slice servers that are associated with a first vault of a dispersed data storage network.

FIG. 2a shows the associations between different components of the illustrated dispersed data storage network. As illustrated, grid access computer 202 hosts vault 206, which stores data on slice servers 212-214, 216, 218, and 219. Accordingly, grid access computer 202 and slice servers 212-214, 216, 218, and 219 are "reachable" by vault 206.

Figure 2B:
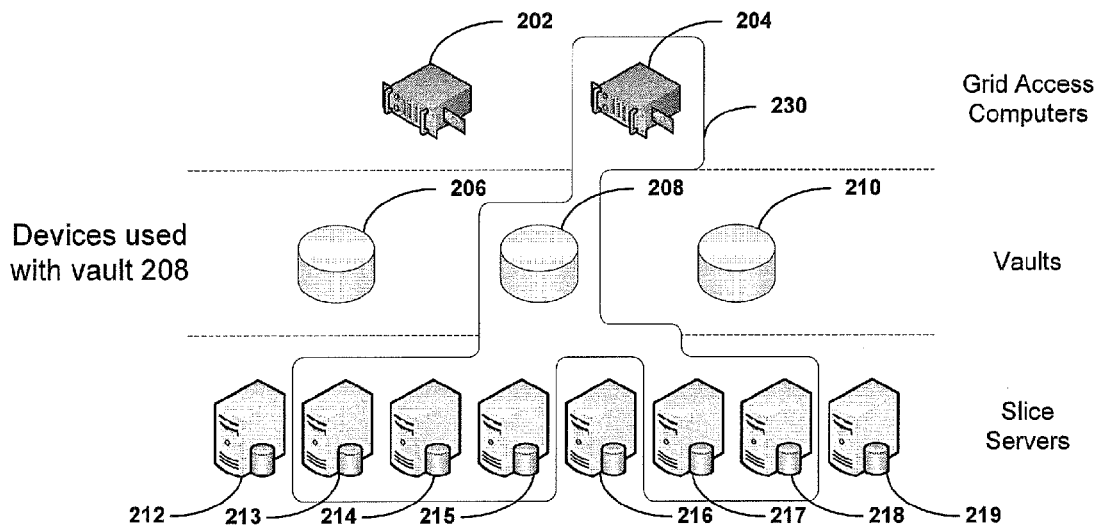
FIG. 2b is a simplified system diagram illustrating the grid access computers and slice servers that are associated with a second vault of a dispersed data storage network.

FIG. 2b illustrates the devices reachable by vault 208. As illustrated, grid access computer 204 hosts vault 208, which stores data on slice servers 213-215, 217, and 218.

Figure 2C:
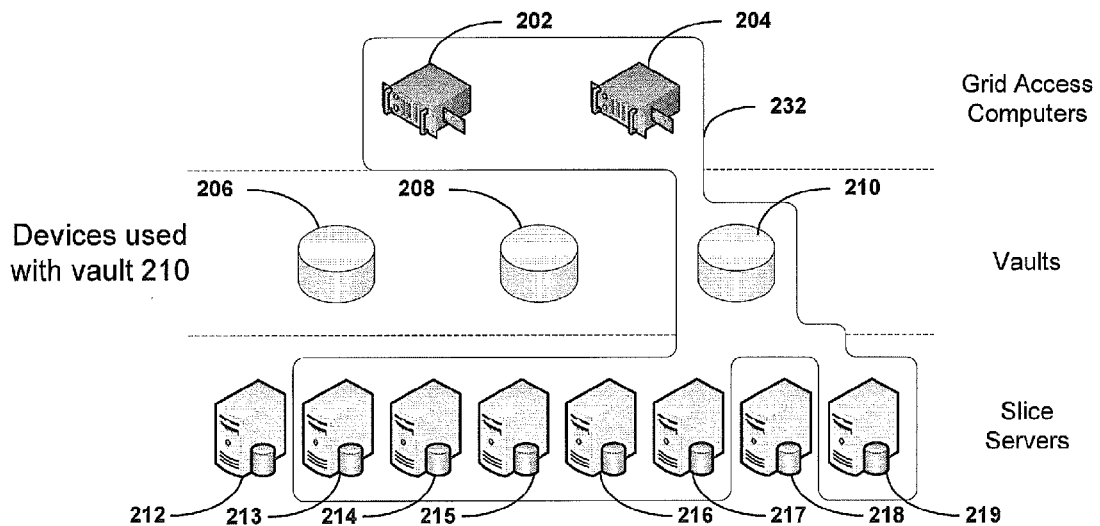
FIG. 2c is a simplified system diagram illustrating the grid access computers and slice servers that are associated with a third vault of a dispersed data storage network.

FIG. 2c illustrates the devices reachable by vault 210. As illustrated, grid access computers 202 and 204 host vault 210, which stores data on slice servers 213-217 and 219.

FIGS. 3a-3f illustrate a method of assigning the components of a dispersed data storage network into upgrade sets. This method, which can be implemented as a software program, routine, or procedure, runs, in one embodiment, on the upgrade management computer. Alternatively, the method can be executed by any other computer within the dispersed data storage network, such as, for example, the registry computer, or a grid access computer. Furthermore, the method can be executed periodically, such as once per hour, or once per day, or its execution can be triggered when a new device is added to the network.

FIG. 3a illustrates the first step of the method. In this step, a new upgrade set 324 is created, and a vault 314 that has not yet been selected is added to the upgrade set 324. In the second step of the method, illustrated in FIG. 3b, all slice servers 302, 304 associated with the vault 314 are added to the upgrade set 324. Steps 3 and 4 are illustrated in FIG. 3c. In step 3, all vaults associated with the slice servers 302, 304 added in the previous step are discovered, and, if any are discovered, they are added to the upgrade set. As no additional vaults are associated with slice servers 302, 304, execution proceeds to step 4, where all grid access computers 320 associated with vault 314 are discovered, and added to the upgrade set 324.

In step 5, which is illustrated in FIG. 3d, all additional vaults 316 associated with the grid access computers 320 discovered in the previous step are discovered, and added to the upgrade set 324. Step 6 is illustrated in FIG. 3e, and requires that all slice servers 308, 310 associated with the vaults 316 discovered in the previous step be discovered, and added to the upgrade set 324. In step 7, which is illustrated in FIG. 3f, as there are no additional associations present in upgrade set 324, execution returns to step 1, where a new upgrade set is created. This process repeats until every device within the dispersed data storage network is assigned to an upgrade set. For example, a second upgrade set will consist of vault 326, access computer 322, and slice servers 310, 312. All devices that are not associated with any vaults are lumped into a common upgrade set. Accordingly, access computer 328 and slice server 330 will be assigned to a common upgrade set.

Figure 4:
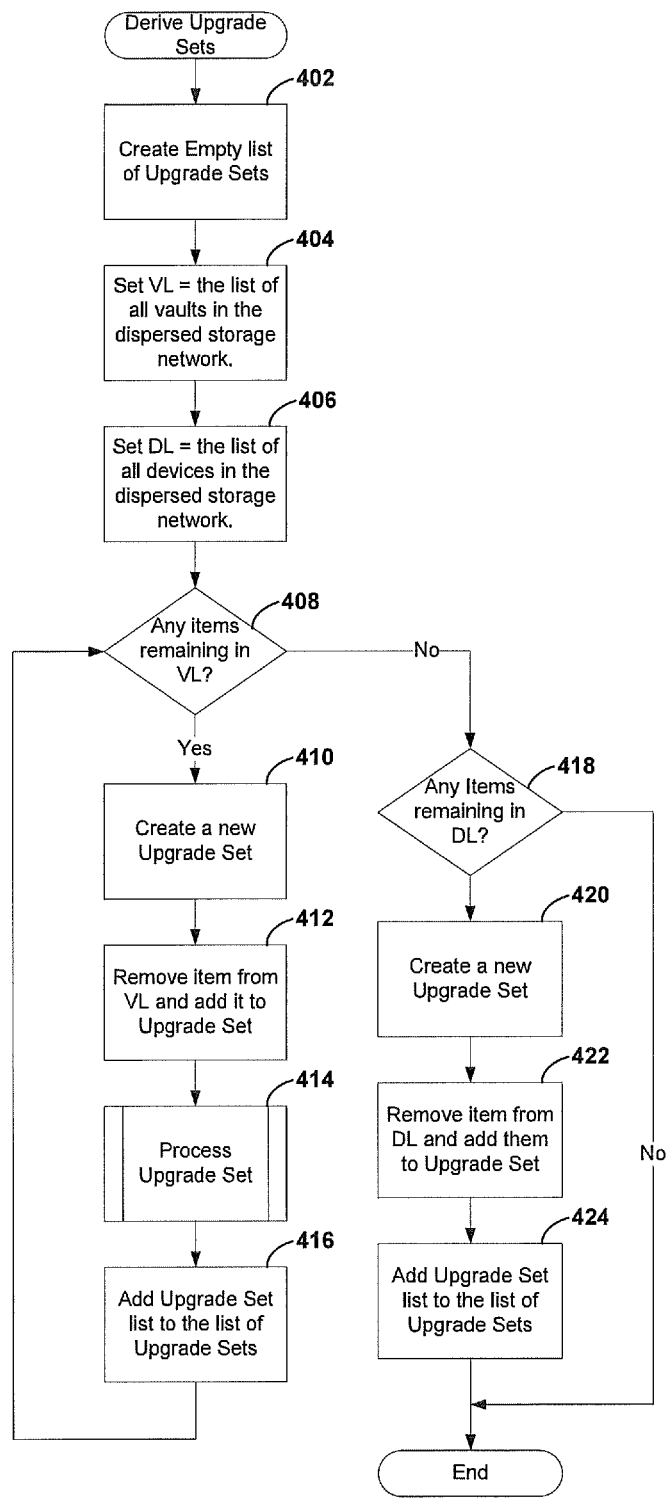
FIG. 4 is a flowchart illustrating a method of deriving one or more upgrade sets of related devices and/or software components utilized by a dispersed data storage network upgrade system.

FIG. 4 shows a method by which all upgrade sets within a dispersed data storage network may be derived. This method, which can be implemented as a software program, routine, or procedure, runs, in one embodiment, on the upgrade management computer. Alternatively, the method can be executed by any other computer within the dispersed data storage network, such as, for example, the registry computer, or a grid access computer. Furthermore, the method can be executed periodically, such as once per hour, or once per day, or its execution can be triggered when a new device is added to the network.

In step 402, an empty list of upgrade sets is created, and in step 404, a vault list variable ("VL") is set to the head of a list of all vaults maintained by the dispersed data storage network. In step 406, a device list variable ("DL") is set to the head of a list containing identifiers for all devices in the dispersed data storage network. In step 408, the vault list variable is checked to see if there are any vaults that have not yet been processed, and, if so, execution proceeds to step 410, where a new upgrade set is created. In step 412, the vault pointed at by VL is removed from the vault list and added to the upgrade set, and in step 414, the process upgrade set procedure is called. The process upgrade set procedure is described in FIG. 5 and its accompanying text below. In step 416, the newly populated upgrade set is added to the list of upgrade sets, and execution returns to step 408.

When step 408 is processed, if there are no additional vaults to process, execution proceeds to step 418, where the device list variable is checked to determine if any device identifiers have not been processed. If there are no additional device identifiers to process, the method terminates. However, if there are additional device identifiers to process, execution proceeds to step 420, where a new upgrade set is created. In step 422, any additional device identifiers are added to the upgrade set created in step 420, and in step 424, this upgrade set is added to the list of upgrade sets. The method then terminates.

Figure 5:
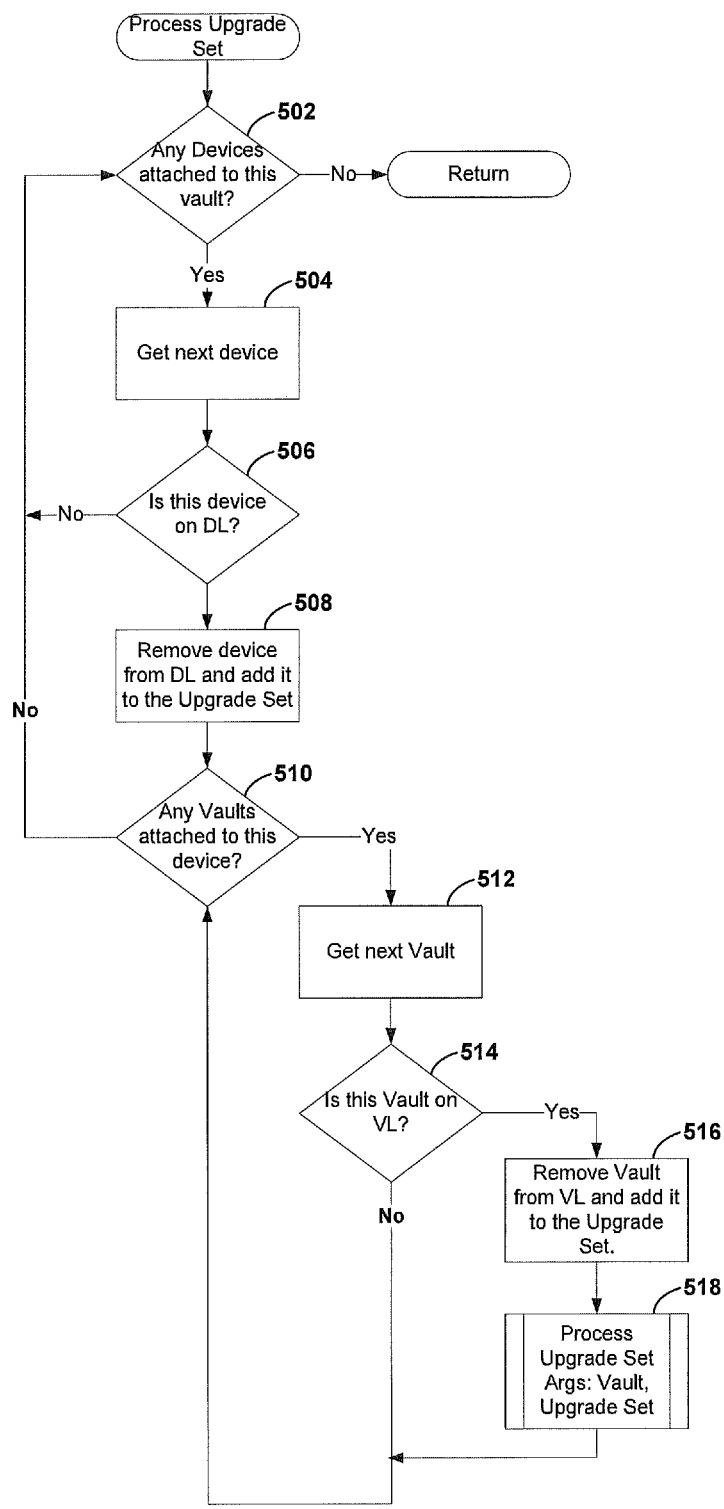
FIG. 5 is a flowchart illustrating a recursive method for determining the members of an upgrade set comprised of a subset of the members of a dispersed data storage network.

FIG. 5 shows a method for populating an upgrade set, based on a vault identifier and upgrade set identifier. This method may be implemented as a procedure, function, or routine on a computer, and the vault identifier and upgrade set identifier may be passed to the method as arguments. In step 502, the vault identifier passed to the method is checked to determine if any device identifiers are associated with the vault identifier. If not, the method terminates, and returns to the calling procedure, function, routine, etc. However, if any devices are associated with the passed vault identifier, the next device associated with the vault identifier is retrieved in step 504. In step 506 the device list is checked to determine if the retrieved device identifier is still referenced within the device list. If not, it has already been placed into an upgrade set, and execution returns to step 502. However, if the device identifier is referenced within the device list, execution proceeds to step 508, where the device identifier is removed from the device list and added to the upgrade set corresponding to the upgrade set identifier passed as an argument to the method.

In step 510, any unprocessed vault identifiers associated with the device identifier retrieved in step 504 are discovered; if there are none, execution proceeds to step 502. However, if there are unprocessed vault identifiers, execution proceeds to step 512, where the next unprocessed vault identifier associated with the device retrieved in step 504 is retrieved. In step 514, the retrieved vault identifier is compared with the vault list to determine if it has already been assigned to an upgrade set, and if so, execution returns to step 510. However, if the retrieved vault identifier is still present within the vault list, execution proceeds to step 516, where it is removed from the vault list, and added to the upgrade set passed as an argument to the method. In step 518, the process upgrade set is called recursively with the retrieved vault identifier and the upgrade set earlier passed to the method.

Figure 6:
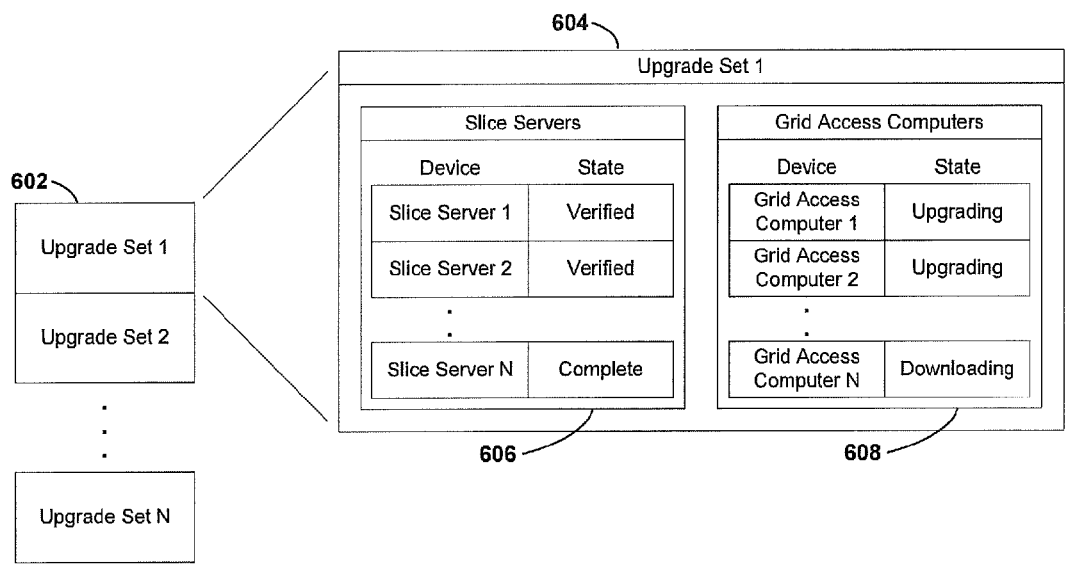
FIG. 6 is an illustration of upgrade set queue and the underlying data structure comprising the upgrade set queue.

FIG. 6 depicts a list of upgrade sets 602, as well as the underlying upgrade set data structure 604. The list of upgrade sets may be implemented using any suitable data structure, such as, for example, an array along with a count of upgrade sets, a null terminated array, a linked list, a doubly linked list, or a queue. The upgrade set data structure 604 consists of a list of slice servers 606, and a list of grid access computers 608. Each of these lists may be implemented by any suitable data structure. Each member of the slice server list 606 and grid access computer list 608 includes a device identifier 610, and a state variable 612. The state variable 612 indicates the upgrade status of the device corresponding to the device identifier 610.

Figure 7:
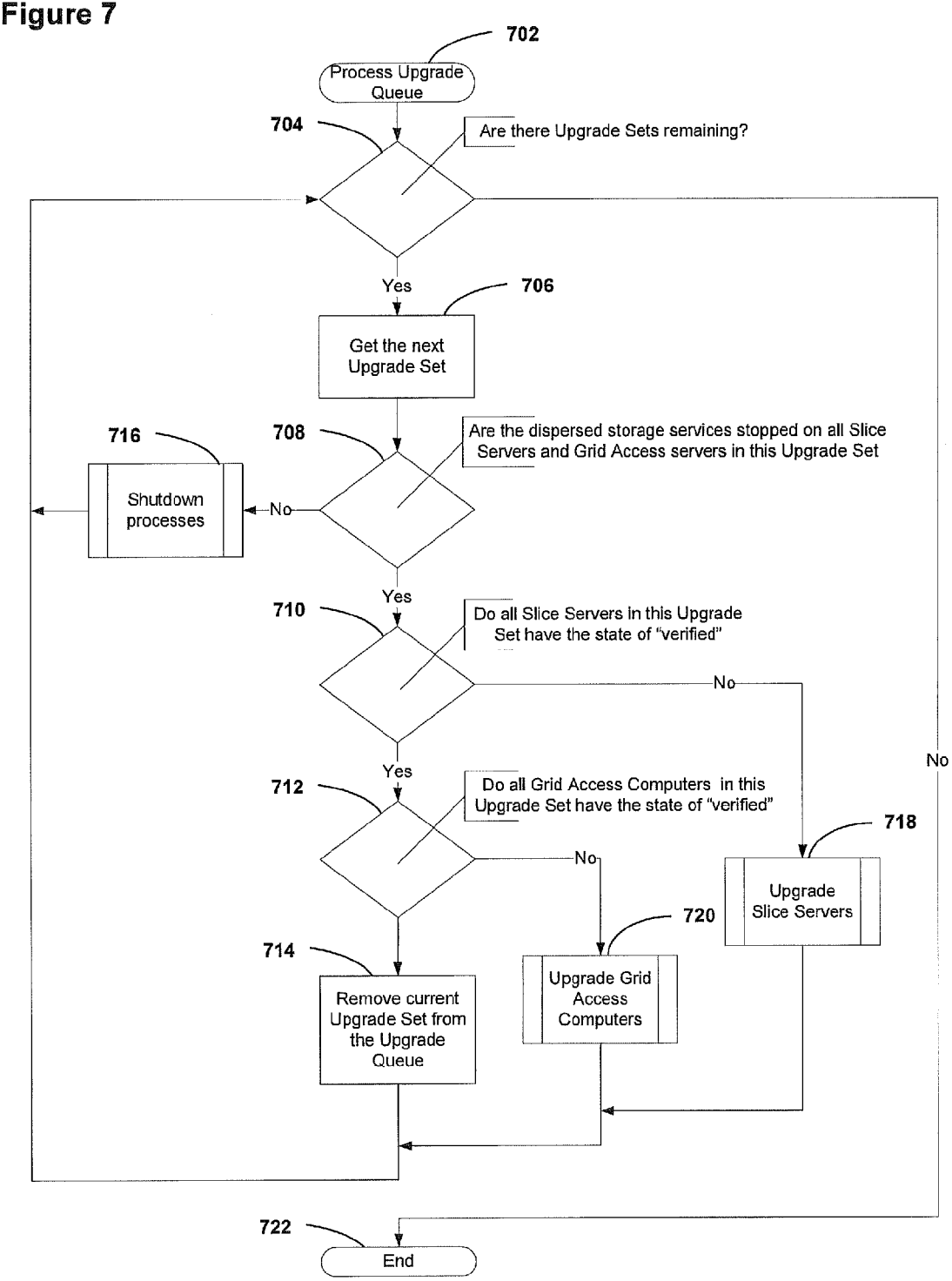
FIG. 7 is a flowchart illustrating a method for processing an upgrade queue for use in a dispersed data storage network upgrade system.

FIG. 7 illustrates a method for processing a list or queue of upgrade sets 702 assembled using the earlier disclosed methods. This method, which can be implemented as a software program, routine, or procedure, runs, in one embodiment, on the upgrade management computer. Alternatively, the method can be executed by any other computer within the dispersed data storage network, such as, for example, the registry computer, or a grid access computer. Furthermore, the method can be executed periodically, such as once per hour, or once per day, or, alternatively, this method may be run as part of the "main loop" of an upgrade management program.

The first step in this method is step 704, which checks whether the upgrade queue has any upgrade sets assembled that are ready for processing. If there are no available upgrade sets, execution proceeds to step 722, which exits the procedure. However, if there are queued upgrade sets, execution proceeds to step 706, which retrieves the next upgrade set. Note that the retrieved upgrade set is not dequeued from the upgrade set queue at this time.

In step 708, each device in the upgrade set is checked to determine if the services on each device within the upgrade set that must be deactivated for the upgrade to proceed have indeed been deactivated. A method for deactivating software components and processes is described in FIG. 10, and its accompanying text.

In one embodiment of the disclosed upgrade system, every service on a device to be upgraded, with the exception of the upgrade service, is stopped. However, alternative embodiments, such as those in which only those services that are to be upgraded by the upgrade are stopped, are also envisioned as part of the disclosed upgrade system. The shutdown processes routine is called in step 716; the shutdown processes routine is described in FIG. 10 and its accompanying text. After the shutdown processes routine returns, execution returns to step 704.

Figure 9:
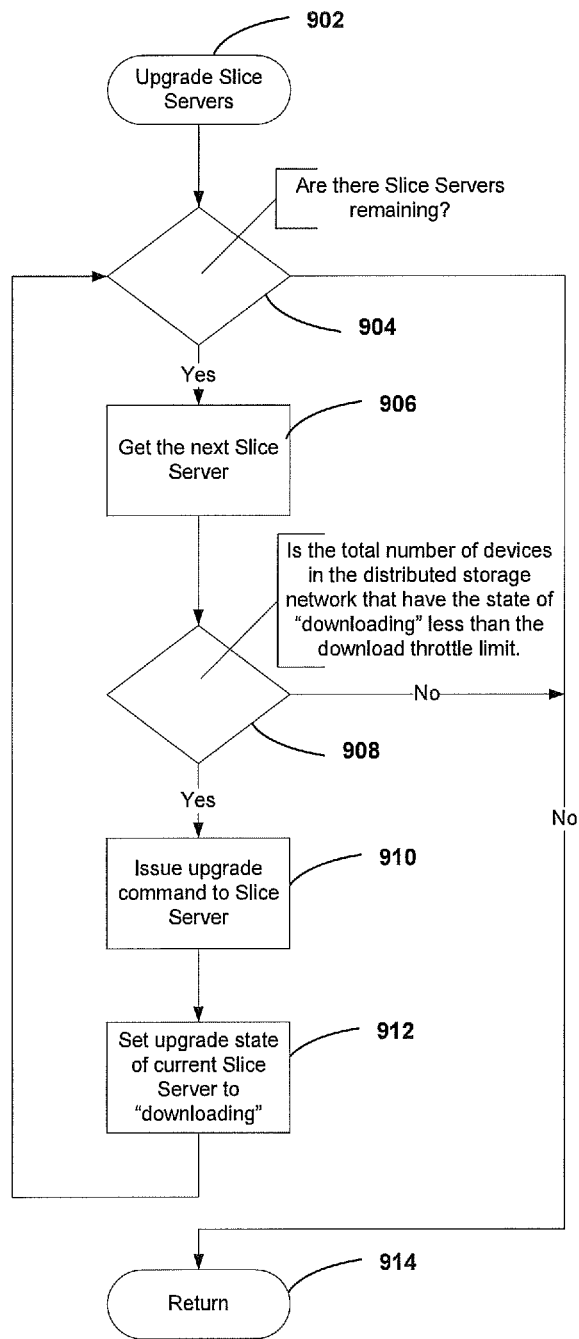
FIG. 9 is a flowchart illustrating a method for upgrading one or more slice servers comprising a part of a dispersed data storage network.

When executing step 708, if no processes must be deactivated before the upgrade process can proceed, execution proceeds to step 710, where all state variables associated with the slice server identifiers within the upgrade set are checked to determine if they have the value "verified." If any of the state variables associated with the slice server identifiers within the upgrade set do not have the value of "verified," the upgrade slice servers method is executed in step 718; the upgrade slice servers method is described in FIG. 9 and its accompanying text. After the upgrade slice servers method returns, execution returns to step 704.

Alternatively, if when step 710 is executed, all state variables associated with the slice server identifiers within the upgrade set are set to the value "verified," execution proceeds to step 712. In step 712, all state variables associated with the grid access computer identifiers within the upgrade set are checked to determine if they have the value "verified." If any of the state variables associated with the grid access computer identifiers within the upgrade set do not have the value of "verified," the upgrade grid access computers routine is called in step 720; the upgrade grid access computers method is described in FIG. 8 and its accompanying text. After the upgrade grid access computers method returns, execution returns to step 704.

However, if when step 712 is executed, all state variables associated with the grid access computer identifiers within the upgrade set are set to the value "verified," execution proceeds to step 714, where the current upgrade set is removed from the upgrade set queue.

Figure 8:
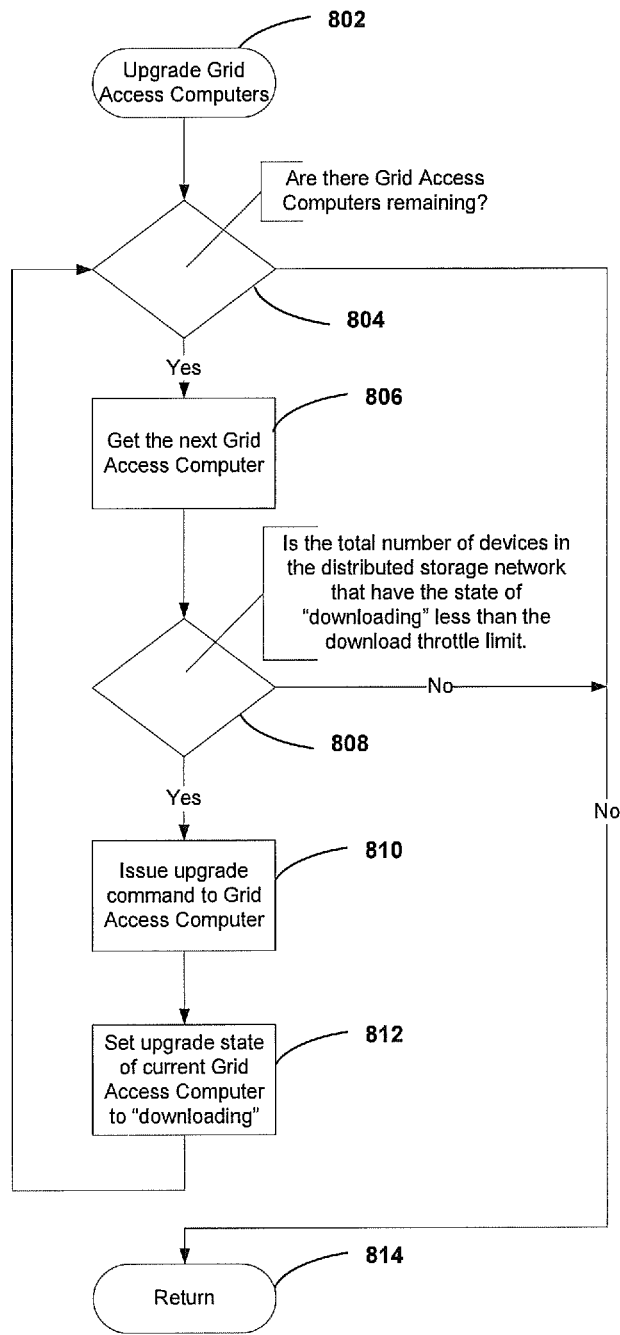
FIG. 8 is a flowchart illustrating a method for upgrading one or more grid access devices for use by a dispersed data storage network upgrade system.

FIG. 8 illustrates a method by which grid access devices can be upgraded. This method, which can be implemented as a software program, routine, or procedure, runs, in one embodiment, on the upgrade management computer. Alternatively, the method can be executed by any other computer within the dispersed data storage network, such as, for example, the registry computer, or a grid access computer.

In step 802, the upgrade grid access device procedure is entered. In step 804, the upgrade set presently being processed is checked for any grid access devices that need to be upgraded, and if grid access devices are present, the next grid access device identifier is retrieved in step 806. Otherwise, the method completes in step 814.

During the upgrade process, the state variables associated with devices that are downloading an upgrade are set to the value "downloading," the device list is iterated through, and a count of state variables with the value "downloading" is maintained. In step 808, the number of devices that are downloading an upgrade are compared to a download throttle limit. If the number of downloading devices exceeds the download throttle limit, execution returns to step 804; otherwise, execution proceeds to step 810, where an upgrade command is issued to the grid access device corresponding to the retrieved grid access identifier. In step 812, the state variable associated with the retrieved grid access identifier is set to the value "downloading," and execution then returns to step 804.

It should be noted that other download throttle techniques may be used, such as, for example, tracking the amount of bandwidth utilized by downloads.

FIG. 9 illustrates a method by which slice servers can be upgraded. This method, which can be implemented as a software program, routine, or procedure, runs, in one embodiment, on the upgrade management computer. Alternatively, the method can be executed by any other computer within the dispersed data storage network, such as, for example, the registry computer, or a grid access computer.

In step 902, the upgrade slice server procedure is entered. In step 904, the upgrade set presently being processed is checked for any slice servers that need to be upgraded, and if slice servers are present, the next slice server identifier is retrieved in step 906. Otherwise, the method completes in step 914.

In step 908, the number of active downloads is compared to the download threshold, and, if the download threshold is exceeded, execution returns to step 904. Otherwise, execution proceeds to step 910, where an upgrade command will be issued to the slice server corresponding to the slice server identifier retrieved in step 906. The state variable corresponding to the retrieved slice server identifier is set to the value of "downloading" in step 912. Execution then returns to step 904, and the method described above will repeat until the download process has begun for all slice servers in the upgrade set.

Figure 10:
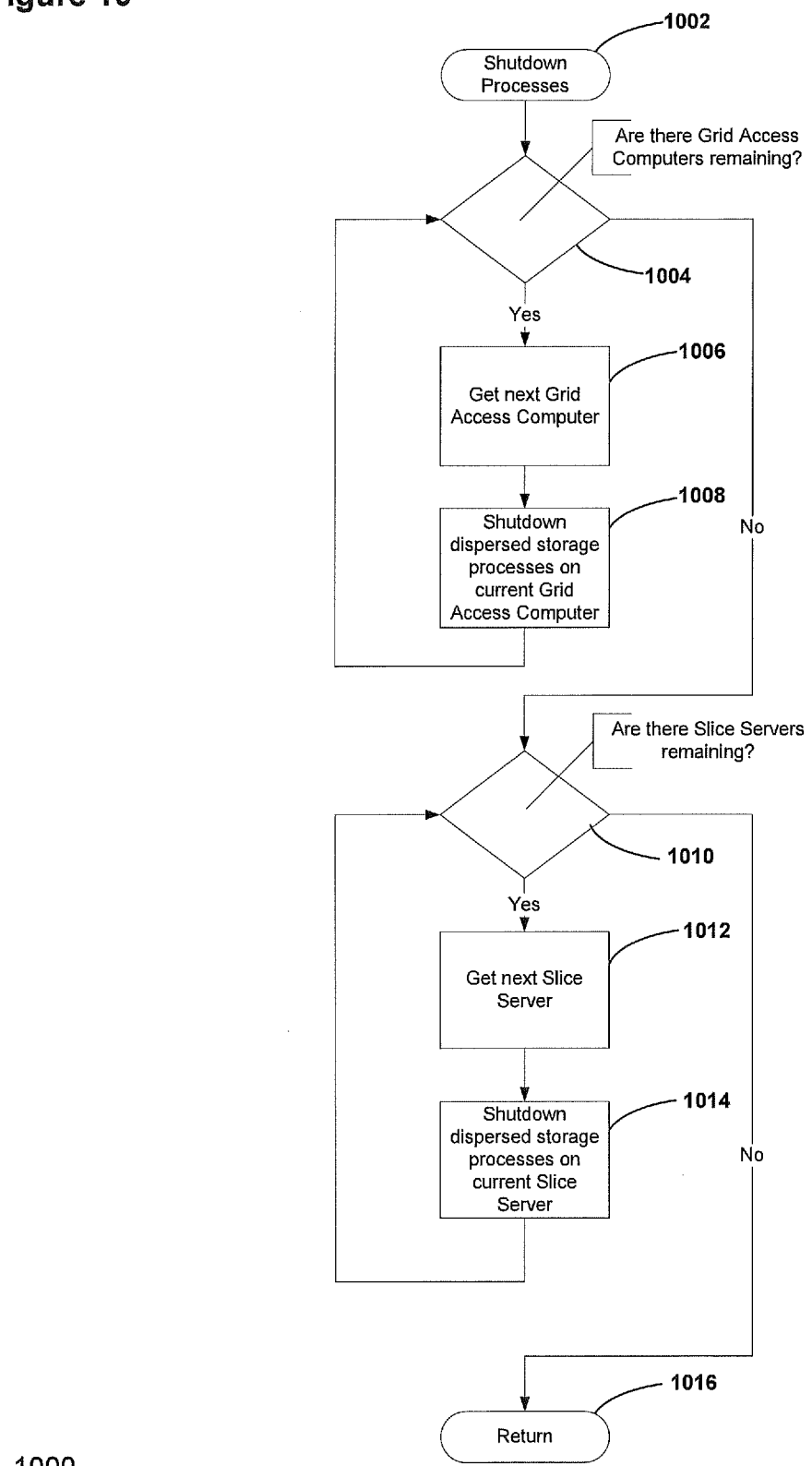
FIG. 10 is a flowchart illustrating a method for shutting down processes related to software components that require upgrading for use by a dispersed data storage network upgrade system.

FIG. 10 illustrates a method by which services that need to be deactivated prior to an upgrade proceeding can be deactivated. This method, which can be implemented as a software program, routine, or procedure, runs, in one embodiment, on the upgrade management computer. Alternatively, the method can be executed by any other computer within the dispersed data storage network, such as, for example, the registry computer, or a grid access computer.

In step 1002, the shutdown procedure is entered. In step 1004, the upgrade set presently being processed is checked for any grid access device identifiers that have not yet been processed by the procedure, and, if no grid access device services require deactivation, execution proceeds to step 1010. However, if there are grid access device identifiers that have not been processed, one such entry is selected in step 1006, and, in step 1008, the processes that must be deactivated on the grid access device corresponding to the retrieved grid access device identifier are shutdown, and execution returns to step 1004.

In step 1010, the upgrade set presently being processed is checked for any slice server identifiers that have not been processed by the procedure, and, if no slice server services require deactivation, execution proceeds to step 1016. However, if there are slice server device identifiers that have not been processed, one such entry is selected in step 1012, and, in step 1014, the processes that must be deactivated on the slice server corresponding to the retrieved slice server identifier are shutdown in step 1014. Execution then transitions to step 1010, which checks to see if additional slice server identifier must be processed. Once no additional slice server identifiers remain, the procedure is exited through step 1016.

Figure 11:
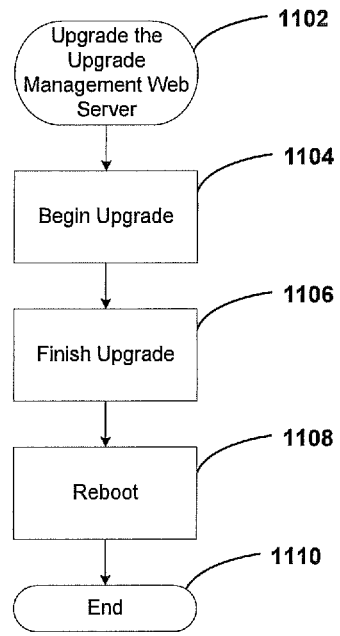
FIG. 11 is a flowchart illustrating a method for upgrading an upgrade management server.

FIG. 11 depicts a method by which the upgrade management web server can be upgraded. Prior to entering this procedure, an administrator would have installed the upgrade files to a specified location on the upgrade manager compute. In step 1102, the upgrade management web server method is begun, and in step 1104, the files previously installed to a specified location are copied to their destinations. In step 1106, the upgrade is finished, and in step 1108, the upgrade manager is rebooted.

Figure 12:
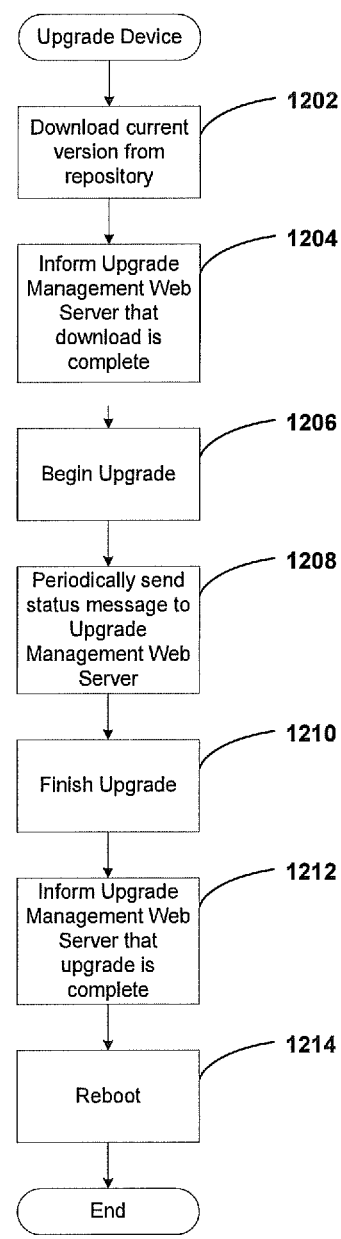
FIG. 12 is a flowchart illustrating a method of upgrading a software component.

FIG. 12 depicts method by which an upgrade can be delivered to a device. This method, which can be implemented as a software program, routine, or procedure, runs, in one embodiment, on the upgrade management computer. Alternatively, the method can be executed by any other computer within the dispersed data storage network, such as, for example, the registry computer, or a grid access computer.

In step 1202, the most recent version of the software package corresponding to the device in need of upgrading is downloaded from the repository, which could be located at the upgrade manager or elsewhere within the network. When the download completes, the upgrade management web server is informed by message of the completion in step 1204. In step 1206, the upgrade is actually started. As will be explained more fully in FIG. 13, and its accompanying text, messages are periodically sent between the device being upgraded and the upgrade management server in step 1208. In step 1210, the upgrade is completed, and in step 1212, the upgrade management server is informed of the completion of the upgrade by message. In step 1214, the upgraded device is rebooted.

Figure 13:
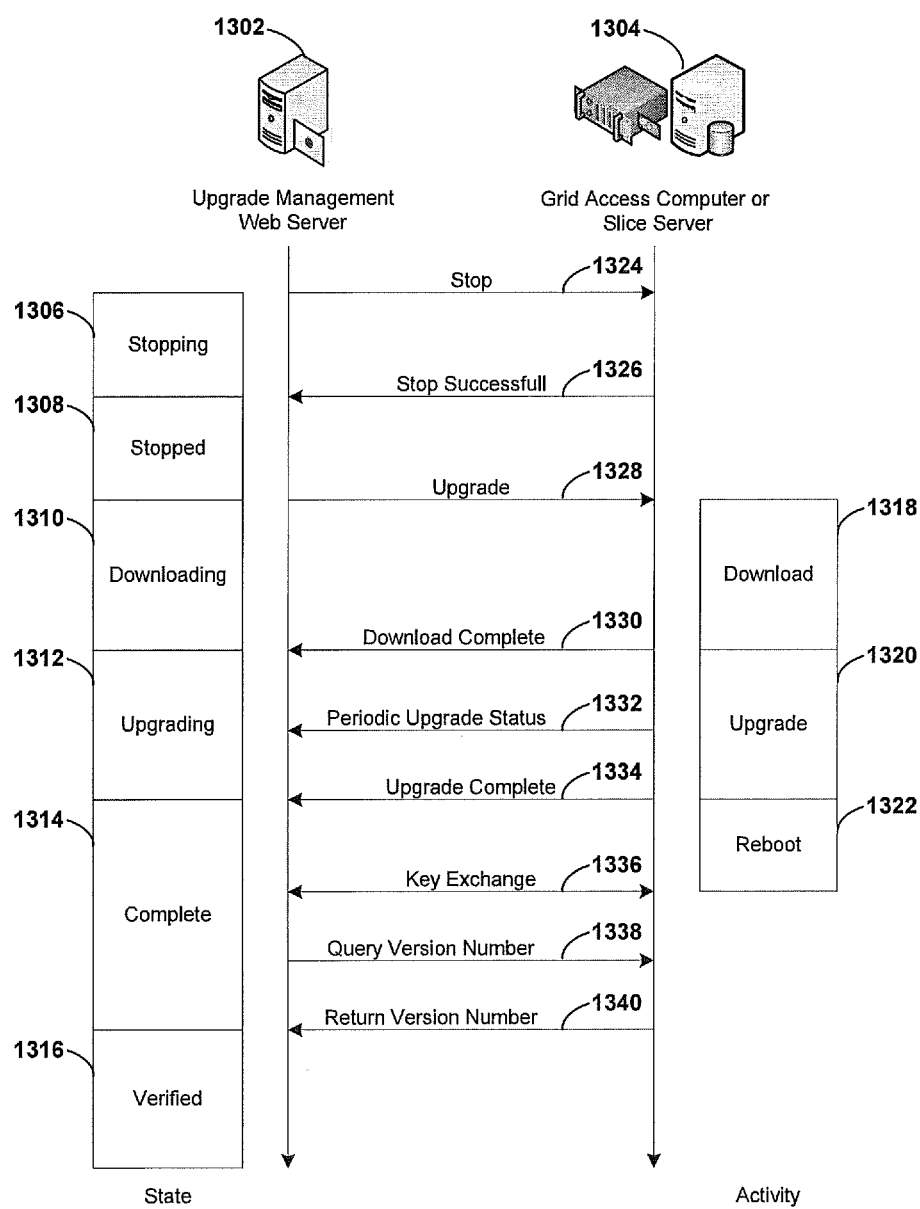
FIG. 13 is a diagram illustrating the messages passed between an upgrade management web server and a device comprising a portion of a dispersed data storage network, as well as the progress of an update as tracked by the upgrade management web server and the device.

FIG. 13 depicts the messages passed between the upgrade management web server 1302 and a component 1304 of the dispersed data storage network, such as a grid access device or slice server, during the upgrade management process. Initially, the state variable corresponding to the device being upgraded is set to the value "stopping" 1306 and a stop message 1324 is sent from the upgrade management server 1302 to the device being upgraded 1304. The device 1304 being upgraded will then stop all services that are required to be stopped and transmit a stop successful message 1326 to the upgrade management server 1302, which will then set the corresponding state variable to the value "stopped" 1308.

Once the services on the device 1304 being upgraded have been stopped, the upgrade management web server 1302 will set the status of the state variable associated with the device to the value "downloading" 1310, and send an upgrade message 1328 to the device 1304 being upgraded. Once the upgrade message 1328 has been received by the device 1304, the device 1304 instantiates a download 1318 from the upgrade management server 1302 of the upgrade package. Once the download is complete, the device 1304 being upgraded will send a download complete message 1330 and begin upgrading 1320 the components to be upgraded. The upgrade management server 1302 will then set the state variable corresponding to the device 1304 to the value "upgrading" 1312.

While the upgrade 1320 proceeds, the device 1304 being upgraded will periodically send status messages 1332 to the upgrade management web server 1302. Once the upgrade 1320 is complete, the device 1304 being upgraded will send an upgrade complete message 1334, and the upgrade management web server 1302 will set the value of the state variable corresponding to the device to the value "complete" 1314. After sending the upgrade complete message 1334, the upgraded device 1304 will reboot 1322 to allow the upgraded services to begin operation.

The upgrade management web server 1302 and the device 1304 being upgraded will then exchange keys 1336 by message. The exchanged keys may be RSA public encryption keys or any other type of secure public encryption key and, in one embodiment of the disclosed upgrade system, each device within the dispersed data storage network will be assigned a unique public key. The upgrade management web server 1302 will then issue a query version number message 1338 to the device 1304, which will respond with a return version number message 1340, containing the version number of the software package installed on the device 1304. If the returned version number matches the version number of the most recent upgrade, the upgrade management web server 1302 will set the value of the state variable corresponding to the upgrade device to "verified" 1316.

The foregoing description of the invention has been presented for purposes of illustration and description, and is not intended to be exhaustive or to limit the invention to the precise form disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. A method for upgrading software in a dispersed data storage network (DDSN), the method comprises:
   selecting a vault from a list of vaults within the DDSN, wherein a vault in the list of vaults identifies at least one user account and devices within the DDSN allocated to the vault;
   creating an upgrade set in a list of upgrade sets of devices from the selected vault and the devices within the DDSN allocated to the vault by:
      determining whether a device in the upgrade set of devices is associated with another vault;
      when the device in the upgrade set of devices is associated with another vault of the list of vaults, determining a list of devices in the DDSN identified in the another vault;
      adding the list of devices in the DDSN identified in the another vault to the upgrade set of devices; and
      adding the upgrade set of devices to the list of upgrade sets of devices, wherein:
         a first type of device of the devices within the DDSN allocated to the vault performs a slice server function of storing or retrieving a data slice of a plurality of data slices; and
         a second type of device of the devices within the DDSN allocated to the vault performs a grid access function of:
            executing an information dispersal algorithm to convert data into the plurality of data slices or to convert at least a threshold number of the plurality of data slices into the data; and
            executing a write operation or a read operation regarding at least some of the plurality of data slices;
   determining whether the upgrade set in the list of upgrade sets is ready for upgrade processing; and
   when the upgrade set is ready for upgrade processing:
      determining whether the slice server function of a first type of device within the upgrade set is to be upgraded;
      when the slice server function of the first type of device is to be upgraded, upgrading the slice server function of the first type of device;
      determining whether the grid access function of a second type of device within the upgrade set is to be upgraded; and
      when the grid access function of a second type of device within the upgrade set is to be upgraded, upgrading the grid access function of the second type of device.

2. The method of claim 1 further comprises:
   determining whether the slice server function of a first type of device within the upgrade set is to be upgraded by:
      determining whether a status indicator for the first type of device is set to verified; and
      when the status indicator is not set to verified, indicating the slice server function of the first type of device is to be upgraded; and
   determining whether the grid access function of a second type of device within the upgrade set is to be upgraded by:
      determining whether a status indicate for the second type of device is set to verified; and
      when the status indicator is not set to verified, indicating the grid access function of the second type of device is to be upgraded.

3. The method of claim 1 further comprises:
   upgrading the slice server function of the first type of device by:
      disabling the slice server function;
      upgrading the slice server function of the first type of device; and
      rebooting the first type of device; and
   upgrading the grid access function of the second type of device by:
      disabling the grid access function;
      upgrading the grid access function of the second type of device; and
      rebooting the second type of device.

4. A device comprises:
   a network node in a dispersed data storage network (DDSN);
   a storage device; and
   a processor coupled to the network node and the storage device, wherein the processor is operable to:
   identify a set of devices within the DDSN for upgrading by:
      creating an upgrade set of devices in a list of upgrade sets from a list of vaults within the DDSN and a list of devices within the DDSN by:
         for at least one vault from the list of vaults, identifying an initial set of devices from the list of devices within the DDSN associated with the at least one vault;
         determining whether a device of the initial set of devices is associated with another vault;
         when the device of the initial set of devices is associated with another vault, identifying a second initial set of devices from the list of devices within the DDSN associated with the another vault;
         creating the upgrade set of devices based on the initial set of devices and the second initial set of devices; and
         adding the upgrade set of devices to the list of upgrade sets, wherein the upgrade set of devices includes one or more devices from the list of devices within the DDSN associated with at least one vault from the list of vaults and wherein the at least one vault in the list of vaults identifies at least one user account and one or more devices within the DDSN allocated to the vault;
      identifying the upgrade set of devices from the list of upgrade sets, wherein the upgrade set of devices includes:
         one or more first type of devices associated with the vault, each performing a slice server function of storing or retrieving a data slice of a plurality of data slices; and
         one or more second type of devices associated with the vault, each performing a grid access function of:
            executing an information dispersal algorithm to convert data into the plurality of data slices or to convert the plurality of data slices into the data; and
            executing a write operation or a read operation regarding at least some of the plurality of data slices;

execute a shutdown function to prepare the upgrade set of devices for upgrading;
when the upgrade set of devices are in a shutdown state, upgrade the upgrade set of devices to produce a set of upgraded devices by at least one of:
download, via a network port, an upgraded slice server function to at least one of the one or more first type of devices;
download, via the network port, an upgraded grid access function to at least one of the one or more second type of devices; and
facilitate rebooting of the set of upgraded devices.

5. The device of claim 4, wherein the processor is further operable to execute the shutdown function by:
for each of the one or more first type of devices, issuing a stop command to disable the slice server function; and
for each of the one or more second type of devices, issuing a stop command to disable the grid access function.

6. The device of claim 4, wherein the processor is further operable to upgrade the set of devices by:
when the one or more first type of devices includes a plurality of first type of devices, determining whether a number of the plurality of first type of devices compares unfavorably to a first download threshold;
when the number of the plurality of first type of devices compares unfavorably to the first download threshold, concurrently downloading the upgraded slice server function to at most some of the plurality of first type of devices and, subsequently, downloading the upgraded slice server function to remaining first type of devices of the plurality of first type of devices;
when the one or more second type of devices includes a plurality of second type of devices, determining whether a number of the plurality of second type of devices compares unfavorably to a second download threshold; and
when the number of the plurality of second type of devices compares unfavorably to the second download threshold, concurrently downloading the upgraded grid access function to at most some of the plurality of second type of devices and, subsequently, downloading the upgraded grid access function to remaining second type of devices of the plurality of second type of devices.

7. A device comprises:
a network node in a dispersed data storage network (DDSN);
a storage device; and
a processor coupled to the network node and the storage device, wherein the processor is operable to:
select at least one vault from a list of vaults, wherein the at least one vault identifies a user account and identifies a set of devices of a list of devices associated with the user account;
determine an initial set of devices in an upgrade set in a list of upgrade sets of devices, wherein the initial set of devices includes the list of devices associated with the user account identified by the at least one vault, wherein:
a first type of device in the initial set of devices performs a slice server function of storing or retrieving a data slice of a plurality of data slices for the user account identified by the vault; and
a second type of device in the initial set of devices performs a grid access function for the user account identified by the vault of:
executing an information dispersal algorithm to convert data into the plurality of data slices or to convert the plurality of data slices into the data; and
executing a write operation or a read operation regarding at least some of the plurality of data slices;
wherein the upgrade set in the list of upgrade sets is created by:
determining whether a device of the initial set of devices is associated with another vault;
when the device of the initial set of devices is associated with another vault of the list of vaults, identifying a second initial set of devices of the list of devices associated with the another vault;
creating the upgrade set of devices based on the initial set of devices and the second initial set of devices; and
adding the upgrade set of devices to the list of upgrade sets of devices;
determine whether the upgrade set in the list of upgrade sets is ready for upgrade processing; and
when the upgrade set is ready for upgrade processing:
determine whether the slice server function of a first type of device within the upgrade set is to be upgraded;
when the slice server function of the first type of device is to be upgraded, download an upgraded slice server function to the first type of device;
determine whether the grid access function of a second type of device within the upgrade set is to be upgraded; and
when the grid access function of a second type of device within the upgrade set is to be upgraded, download an upgraded grid access function to the second type of device.

8. The device of claim 7, wherein the processor is further operable to:
determine whether the slice server function of a first type of device within the upgrade set is to be upgraded by:
determining whether a status indicator for the first type of device is set to verified; and
when the status indicator is not set to verified, indicating the slice server function of the first type of device is to be upgraded; and
determine whether the grid access function of a second type of device within the upgrade set is to be upgraded by:
determining whether a status indicate for the second type of device is set to verified; and
when the status indicator is not set to verified, indicating the grid access function of the second type of device is to be upgraded.

9. The device of claim 7, wherein the processor is further operable to:
download the upgraded slice server function to the first type of device by:
sending a stop command to disable the slice server function of the first type of device;
downloading the upgraded slice server function to the first type of device; and
facilitating rebooting of the first type of device; and
download the upgraded grid access function of the second type of device by:
sending a stop command to disable the grid access function of the second type of device;

downloading the upgraded grid access function to the
second type of device; and facilitating rebooting of the second type of device.

10. The device of claim 7, wherein the at least one vault in the list of vaults associates at least one client account with one or more devices in the list of devices in the DDSN.

\* \* \* \* \*